United States Patent [19]

Partridge

[11] Patent Number: 5,010,919
[45] Date of Patent: Apr. 30, 1991

[54] SUBSEA BARRIER VALVE

[75] Inventor: Charles C. Partridge, Houston, Tex.

[73] Assignee: Tom Wheatley Valve Co., Houston, Tex.

[21] Appl. No.: 484,055

[22] Filed: Feb. 23, 1990

[51] Int. Cl.$^5$ .............................................. F16K 15/00
[52] U.S. Cl. ............................... 137/527.4; 137/527.8; 251/250; 405/169
[58] Field of Search ............... 405/169, 170, 171, 195; 166/363, 336, 324, 332, 321, 264; 137/527.4, 527.8

[56] References Cited

U.S. PATENT DOCUMENTS

| | | | |
|---|---|---|---|
| 2,974,921 | 3/1961 | Kaswan | 251/250 X |
| 3,478,778 | 11/1969 | Curtiss et al. | 137/527.4 |
| 3,720,229 | 3/1973 | Masson et al. | 137/527.8 |
| 3,766,978 | 10/1973 | Orund et al. | 166/363 X |
| 4,188,973 | 2/1980 | Weise et al. | 137/527.4 X |
| 4,217,929 | 8/1980 | Pelt | 137/527.8 |
| 4,387,735 | 6/1983 | Ripert | 251/250 |
| 4,502,503 | 3/1985 | Karpenko | 137/527.8 |
| 4,565,210 | 1/1986 | Heine et al. | 251/250 X |

Primary Examiner—Dennis L. Taylor

[57] ABSTRACT

A subsea barrier valve 20 with a valve clapper 60 adapted for free swinging movement on a clapper shaft 62 between a position which closes the flow passage through the valve and a position proximate the fully open position such that the clapper is held open by a pressurized flow of gas through the valve. In the event of an upstream pipeline failure, the clapper closes in a "fail-safe" manner. The clapper can be pivoted and locked in the full open position by axial rotation of a locking shaft 105 which extends through a cover member 30 for an access opening in the valve body 21. The locking shaft 105 extends perpendicular to the clapper shaft 62 and is interconnected therewith by a gear drive 106 including a clutch gear 126 which allows a limited range of free pivotal movement of the clapper 60. The locking shaft 105 is controlled by actuator means 140,141 mounted on the cover member 30 by a separable fastener 142. The cover member 30 is clamped by a releasable clamp means 35. Projecting mandrels 260 on a clamping ring component 85 of the releasable clamp means 35 can be seized by a grappling tool for release or installation of the clamp means. A similar mandrel 149 on the cover member 30 allows for retrieval of the valve 20 or its intervals when the cover member 30 is released. Mandrels 208 provided on a support plate 144 for the actuator means 140,141 permit the retrieval or replacement of the actuator means.

12 Claims, 10 Drawing Sheets

SUBSEA BARRIER VALVE

FIELD OF THE INVENTION

The invention relates to a barrier valve adapted for installation in a subsea pipeline and more particularly to a subsea barrier valve with a free swinging clapper which opened in response to a pressurized flow of gas through the valve and operates in a "fail-safe" manner in the event of an upstream pipeline rupture. The clapper can be locked open by a locking shaft mounted in perpendicular relation to the clapper shaft on a valve insert and controlled by actuator means mounted on the valve in a manner which permits retrieval and/or replacement of the actuator means or the valve internals by a remotely controlled grappling tool.

BACKGROUND OF THE INVENTION

Heretofore, barrier valves of the check valve type designed for installation in a subsea gas pipeline have included a pivotal clapper member which requires a special opening in the valve body for accommodating the installation and removal of the clapper shaft. The valve body of such valves also include an access opening permitting access to the valve internals which is closed by a cover member bolted to the valve body. When it becomes necessary or desirable to retrieve or replace the valve internals, it has been necessary for a diver to go down and manually remove the bolts from the cover member, lift the cover member, and remove the clapper from its clapper shaft connections. The diver next pulled the clapper shaft through the special shaft opening in the valve body, then reached into the access opening to retrieve the loose clapper. The design of the prior valves, by virtue of the special valve body opening required for the clapper shaft, increases the possibility of leakage. In addition, the repair, retrieval and/or replacement of the valve internals requires a dangerous manual procedure which is also time consuming and costly.

SUMMARY OF THE INVENTION

The invention is a subsea barrier valve for installation in a subsea gas pipeline. The valve comprises a valve body with a valve chamber therein and inlet and outlet ports communicating with the chamber to define a flow passage through the valve. The valve is provided with a valve clapper shaft mounted on an insert member in the valve chamber for limited axial rotation and a valve clapper connected thereto whereby the valve clapper is pivotally movable in the valve chamber between a first position wherein the valve clapper closes the flow passage and a second position wherein the flow passage is fully open. The clapper is allowed to free swing in a range between the closed position and a position proximate the full closed position such that the clapper opens in a response to the pressurized flow of gas through the valve. In the event of an upstream pipeline failure, the valve clapper closes in a fail-safe manner. The valve is also provided with an access opening in the valve body and a cover member therefor which can be releasably clamped in sealing relation to the valve body and valve chamber by a releasable clamp means. Means for latching the valve clapper in the fully open position is provided by a locking shaft which is mounted to extend through the cover member in sealing relation thereto and in perpendicular relation to the valve clapper shaft with one end portion extending into the valve chamber and its other end being engageable from outside the cover member for imparting axial rotation to the locking shaft. A drive gear mechanism connected to the end portion of the locking shaft inside the valve chamber is responsive to axial rotation of the locking shaft to pivotally move the valve clapper to the fully open position and to lock the valve clapper in the fully open position. The drive gear mechanism also allows free swinging movement of the valve clapper between the closed position and a position proximate the fully open position whereby the clapper is swung open and maintained in the open condition by a pressurized flow of gas through the valve. Actuator means, mounted on a support plate fixed to the cover member by a separable fastener connection, are also provided for engaging and imparting axial rotation to the locking shaft to pivotally move and lock the clapper in the fully open position for such purposes as reverse flow testing, to remove the internals of the valve, or to allow running a "pig" through the pipeline. A projecting mandrel on the cover member is adapted for seizure by a remote-controlled grappling tool whereby the valve may be lifted from its subsea installation or its internals removed when the releasable clamp means is released. Similar mandrels provided on a clamping ring component of the releasable clamp means permit the actuation of the releasable clamp means by the grappling tool for either clamping or unclamping the cover member from the valve body. The support plate, on which the actuator means are mounted, is also provided with mandrels such that the actuator means may be retrieved from the valve cover member or replaced thereon.

BRIEF DESCRIPTION OF THE DRAWINGS

FIG. is a side view of the drive gear assembly of FIG. 4.

Figure 1:
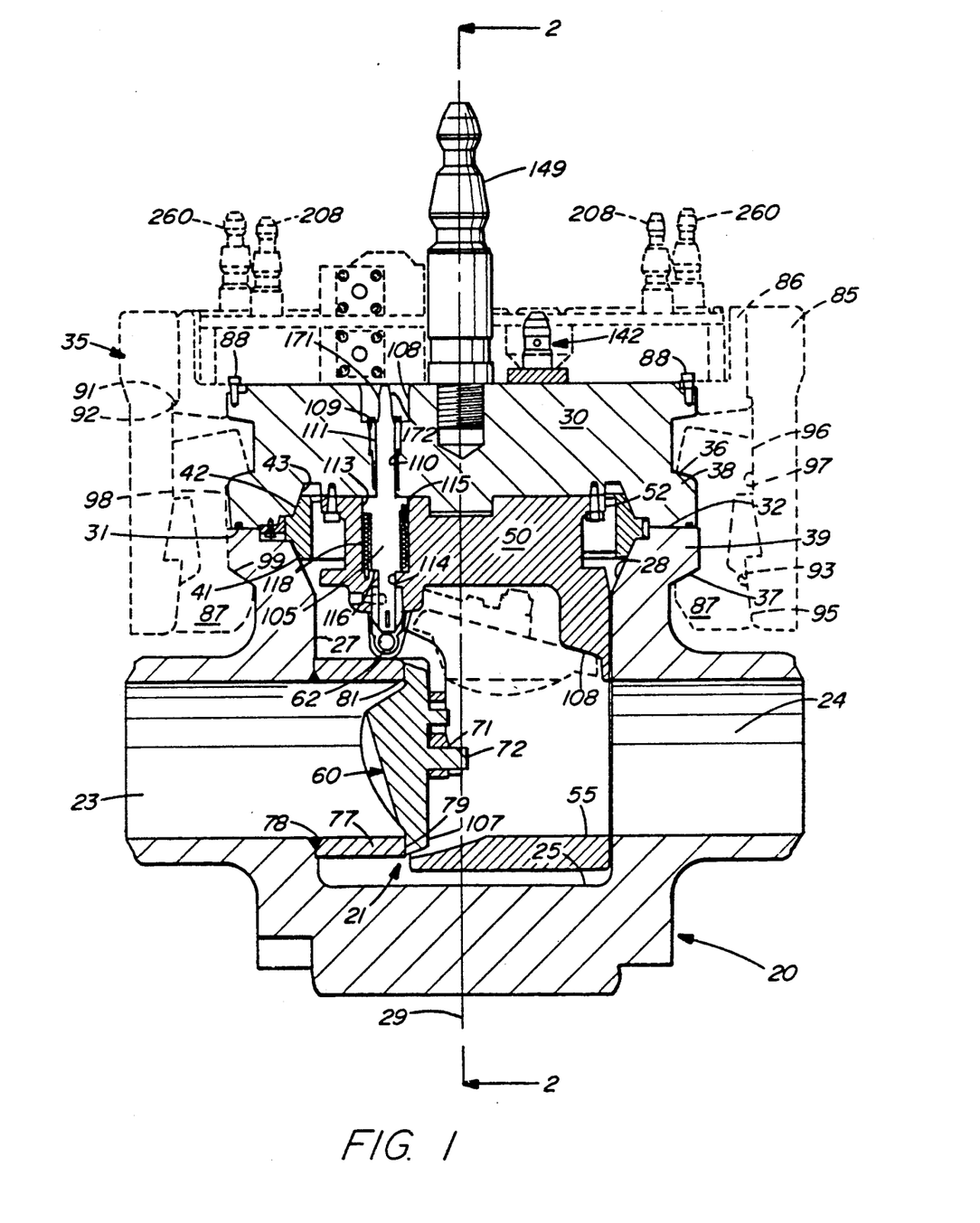
FIG. 1 is a vertical section view of the subsea barrier valve of this invention and showing in dashed lines a valve cover clamping ring and actuator mechanisms mounted atop the valve which are selectively operable for locking the valve clapper in the valve open position.
Figure 2:
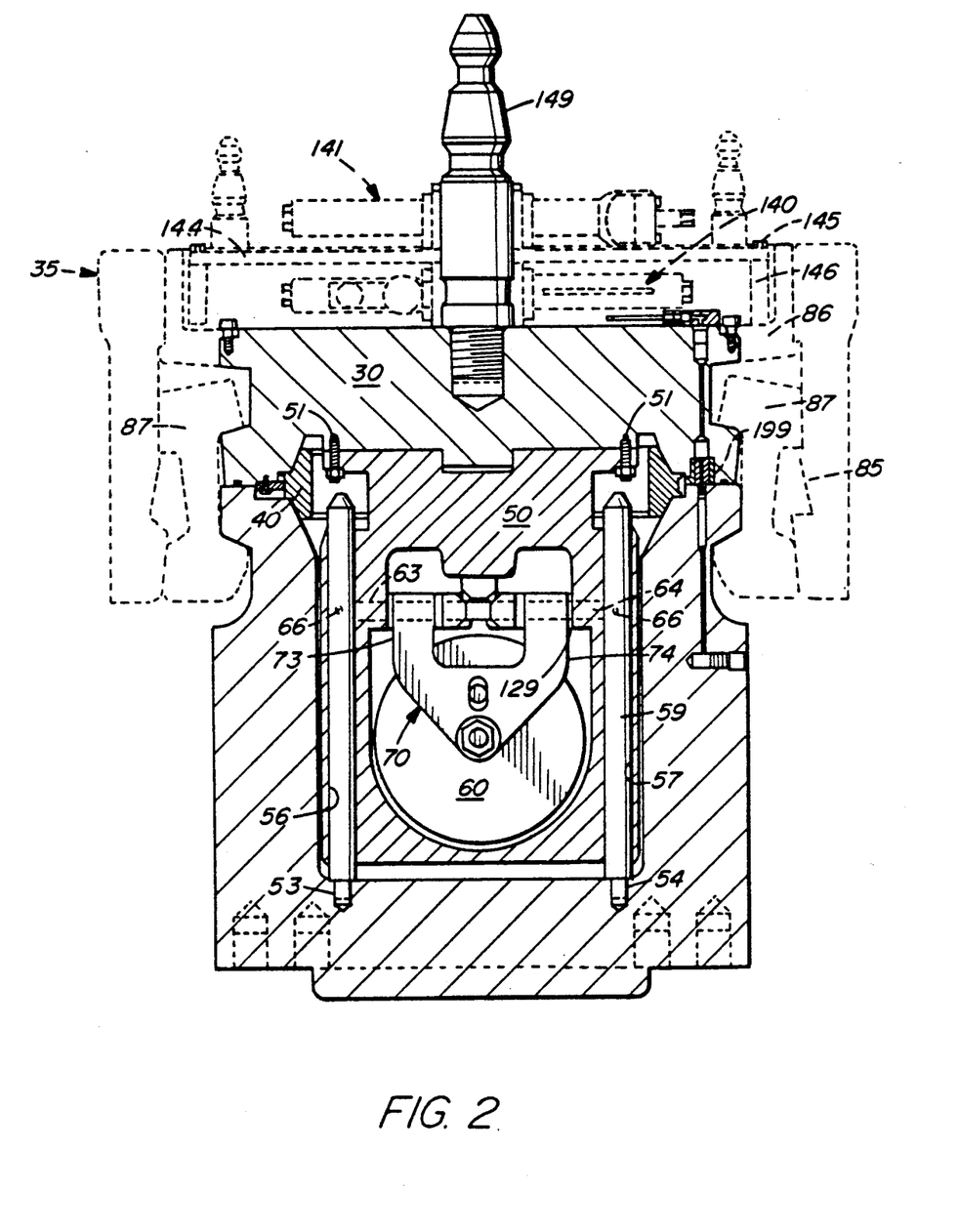
FIG. 2 is a vertical section view of the valve of FIG. 1 as taken along the section line 2—2 in FIG. 1.
Figure 3:
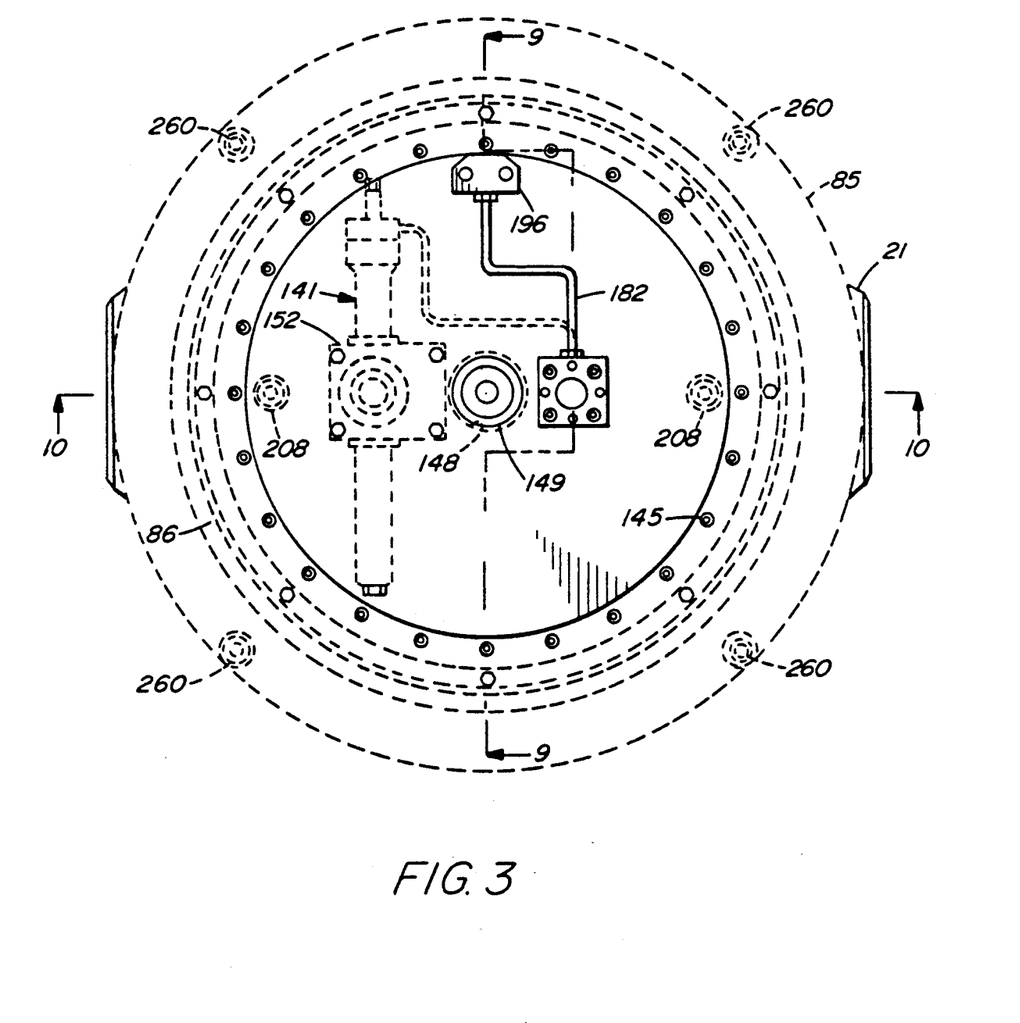
FIG. 3 is a top plan view of the valve of FIG. 1 showing in dashed lines, the valve cover clamp ring and a manual actuator for the valve.
Figure 4:
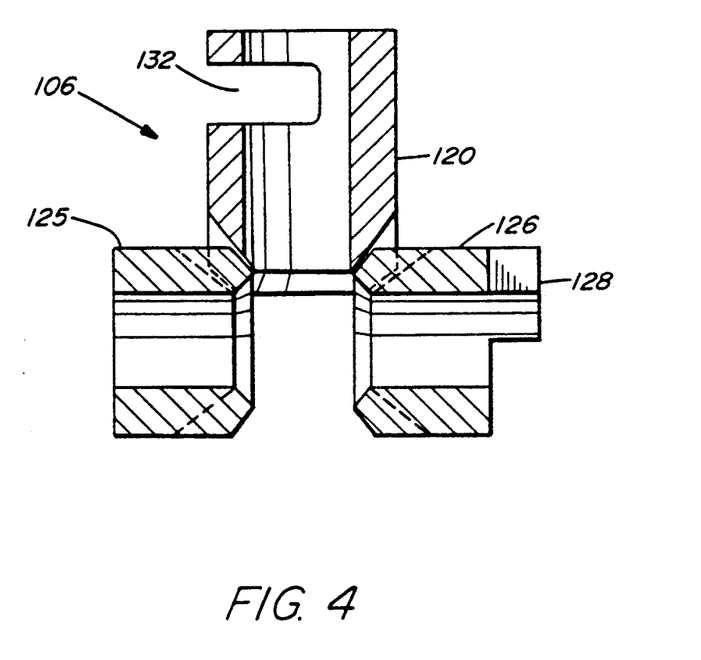
FIG. 4 is an enlarged vertical section view of the drive gear assembly by which axial rotation of the lock-open shaft effects pivotal movement of the valve clapper to the valve open position.
Figure 5:
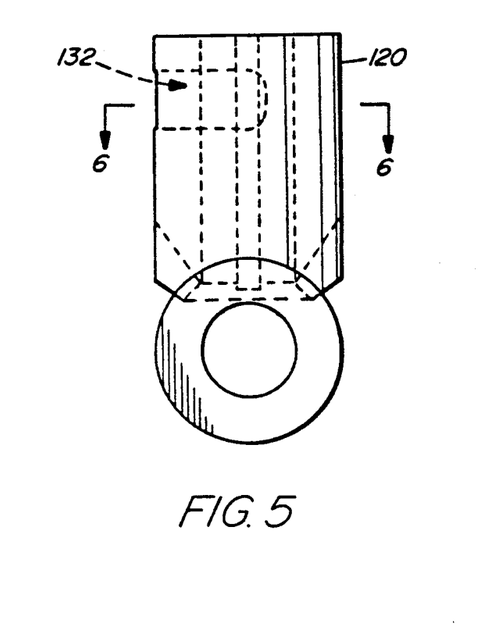
Figure 6:
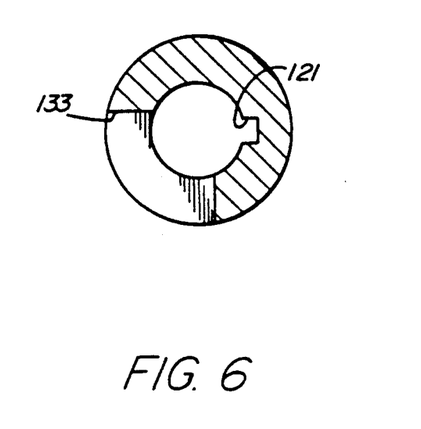
FIG. 6 is a section view of the drive gear of the assembly of FIG. 5 as taken along the section line 6—6.
Figure 7:
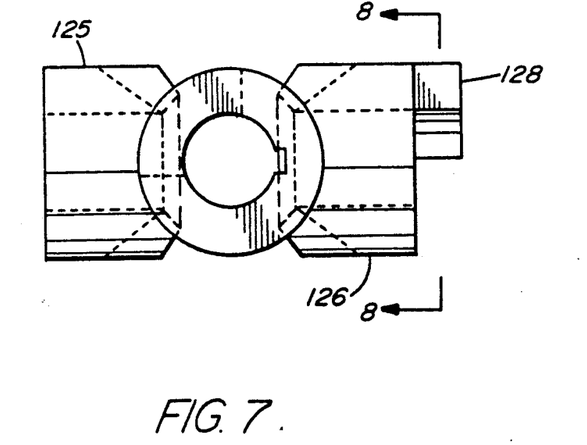
FIG. 7 is a top view of the drive gear assembly of FIG. 5.
Figure 8:
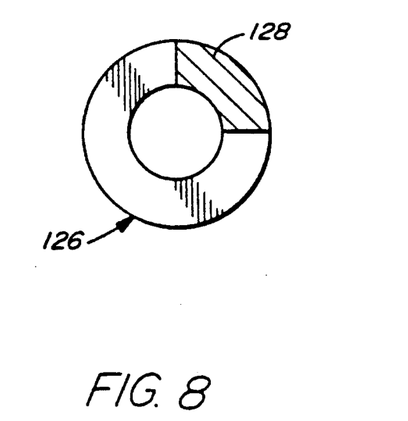
FIG. 8 is a section view of the clutch gear of the assembly as taken along the section line 8—8 in FIG. 7.
Figure 9:
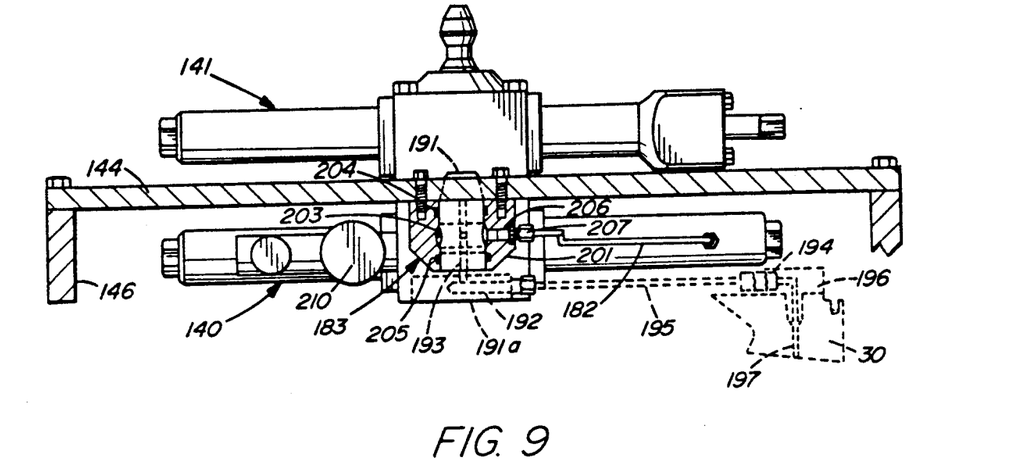
FIG. 9 is an enlarged vertical section view of the valve actuator assembly as taken along the line 9—9 in FIG. 3.

Referring more particularly to the drawings, there is shown in FIG. 1, a subsea barrier valve 20 which is adapted for installation in a subsea gas pipeline. The valve 20 comprises a valve body 21 designed with an interior valve chamber 22 and inlet and outlet ports 23,24 respectively, which communicate with the valve chamber 22 and therewith define a flow passage through the valve. The valve body 21 is also provided with an access opening 27 of circular cross section which, adjacent its open end, is defined by a beveled frusto-conical surface 28, opening outwardly and symmetrical about the central axis 29 of the opening 27.

The access opening 27 is adapted to be closed by a generally circular cover member 30 having an annular end surface 31 adapted to interface with an annular surface 32 formed on the valve body 21 about the opening 27. The cover member 30 is adapted to be clamped in sealing relation to the valve body 21 by a releasable clamp means 35, shown in dashed lines in FIG. 1, and to be hereinafter described. The clamp means 35, when operated to clamp the cover member 30 to the valve body 21, wedgingly engages annular tapering shoulders 36,37 provided by annular flanges 38,39 formed on the cover member 30 and valve body respectively, to establish a high pressure sealing connection therebetween by means of a metallic sealing ring 40. The sealing ring 40 is formed with an external frusto-conical sealing surface 41, which is adapted to sealingly engage the beveled sealing surface 28 on the valve body 21 and an upper external frusto-conical sealing surface 42 which sealing engages a frusto-conical sealing surface 43 provided on the cover member 30. The surfaces 28 and 43 on the valve body 21, respectively, are of equal taper and preferably with a slight mismatch compared to the tapered surfaces 41,42 of the sealing ring 40 such that the clamping of the cover member results in a slight compression of the ring 40 and a fluid-tight seal between their engaged tapered surfaces.

Suspended from the cover member 30 is a tubular insert 50 which is bolted thereto by a plurality of bolts 51. The insert 50 is provided with an annular flange 52 formed with bolt holes for accommodating the bolts 51 which are threaded into accommodating threaded bores formed in the underside of the cover member 30. The insert 50 is formed with an opening 55 which extends through the insert 50. The opening 55, at one end and through a large portion of its extent conforms to the dimensions of the valve inlet and outlet ports 23,24 respectively, and thereby tends to smooth the flow of gas through the valve 20 when aligned therewith. For this purpose, the insert 50 is provided with a pair of vertical bores 56,57 which extend parallel to one another on opposite sides of the insert opening 55. A pair of guide pins 58,59 are received in the bores 56,57, respectively, and each provided with a threaded end portion 53,54, respectively, which is adapted to be installed in a corresponding threaded blind bore formed in the bottom wall 25 of the valve chamber 22. When thus installed in the chamber 22, the insert 50 is oriented such that the insert opening 55 is in registry with the inlet and outlet ports of the valve 20.

The valve 20 is provided with a valve clapper 60 which is suspended for pivotal movement within the valve chamber 22 on a clapper shaft 62. For this purpose, the insert 50 is formed with a pair of aligned bores 63,64 located on opposite sides of the opening 55 and each extending above and transversely with respect to the flow passage through the valve. The respective ends of the clapper shaft 62 are received in the aligned bores 63,64 and secured therein by retainer screws 66 threaded through screw holes in the wall of the insert 50.

The clapper 60 is of generally circular cross section and is pivotally connected to the clapper shaft 62 by a clapper arm 70 secured by a nut 71 to a threaded pin 72 at the center of the clapper 60. The clapper arm 70 is in the form of a yoke with spaced arms 73,74, each of which at its end is sleeved about the clapper shaft 62 and adapted for pivotal rotary movement thereon. The valve body 21 is also provided with a valve seat member 77, an annular tubular member with an internal diameter conforming to that of the inlet port 23. At one end, the seat member 77 is secured by an internal annular weld 78 to the valve body 21 in concentric coaxial relation with the inlet port 23 and the valve flow passage therethrough. The other end of the seat member 77 provides an annular seating surface 79 which is adapted to be sealingly engaged by an O-ring 81 mounted in an accommodating annular groove in the clapper 60. The seating surface 79 is formed of INCONEL, a nickel iron alloy.

The clamp means 35 for releasably clamping the cover member 30 to the valve body 21, comprises a clamping ring 85, an adapter ring 86, and a plurality of collet members 87 arranged circumferentially about the flanges 38,39 of the cover member and the valve body. The adapter ring 86 is sleeved about the periphery of the cover member 30 and connected thereto by a plurality of bolts 88 through bolt holes formed in an internal flange of the adapter ring. The adapter ring 86 is formed with an external upward facing annular stop shoulder 91 which is adapted to support the clamp ring 85 by engagement with an internal downward facing annular shoulder 92 on the clamp ring 85. The lower end of the clamp ring 85 is provided with an internal annular frusto-conical surface 93 which is convergent upwardly and adapted to engage external tapered surfaces 95, each formed on a collet member 87 at the lower end thereof. When the clamp ring 85 is sleeved about the adapter ring 86 and moved downwardly thereon to engage the stop shoulder 91, the internal tapered surface 93 of the clamp ring wedges against the tapered surfaces 95 at the side of the lower end portion of each collet member 87 and urges each collet member 87 against the valve body flange 39. At the same time, an external surface 96 on the side of the upper end portion of each collet member 87 is engaged by an inner cylindrical surface 97 of the clamp ring 85 such that the inward urging of the lower end of each collet member by the clamp ring 85 also urges the upper end of each collet member tightly against the cover member 30. Clamping is accomplished by the engagement of internal beveled surfaces of the collet members with external tapered surfaces provided on the cover member and valve body respectively. Specifically, the downward facing frusto-conical shoulder 37 on the underside of the flange 39 of the valve body is engaged with each upward facing shoulder 99 provided on the inner surface of each collet member and the upward facing frusto-conical shoulder 36 provided on the cover flange 38 engages each downward facing beveled surface 98 provided near the upper end of each collet member on the inner side thereof. The beveled surfaces 98 and 99 of each collet member are spaced such that movement of the collet members 87 in a radially inward direction and their resultant interaction with the tapered surfaces 36 and 37 of the cover member 30 and valve body 21, respectively, applies an axially directed compressive force therebetween. Accordingly, sleeving the clamp ring 35 about the adapter ring 86 to engage the stop shoulder 91 results in clamping the cover member 30 to the valve body 21 with sufficient force to energize the metallic sealing ring 40 and establish a high pressure sealing connection therebetween.

The valve 20 is adapted for installation in a subsea pipeline and the valve body 21 provided with external threads about the inlet and outlet ports 23,24 respectively for threaded connection with the pipeline joints. However, flanged connections or other type connections could be used as well. When installed in a pipeline, an application of pressurized gas to the inlet port 23 of the valve 20 will move the clapper 60 from its seated valve closed position towards a fully open position as shown in dashed lines in FIG. 1. However, the weight of the clapper 60 will return the clapper 60 to the closed position in a "fail-safe" closed operation should there be a cessation in the delivery of pressurized gas to the valve as in the event of an upstream pipeline rupture.

In some instances it is desirable to lock the clapper 60 in the full open position as when it is desired to allow a reverse flow of gas through the valve or when it is desired to run a "pig" through the pipeline for cleaning out obstructive materials. It is also necessary to lock the clapper 60 in the full open position as a prepatory step for the removal of the valve internals.

A means for locking the clapper 60 in the full open position is provided by a locking shaft 105 which extends through the cover member 30 and interacts with the clapper shaft 62 by an interconnecting gear drive mechanism 106 such that the clapper 60 can be pivotally moved to the full open position where it is received in an enlarged recess of the insert 50 in an unobstructing location with respect to the flow passage through the valve. In the full open position, the surface 107 of the clapper on the downstream side thereof engages a stop shoulder 108 provided on the insert 50.

For accommodating the locking shaft 105, the cover member 30 is provided with a bore with successively reduced diameter bore sections 108,109, and 110 through which the shaft 105 extends. The intermediate bore section 109 receives a packing gland 111 which is threaded therein to compress an annular packing received in the small diameter bore section 110 and thereby establish a fluid tight seal between the locking shaft 105 and the cover member 30. The insert 50 is also provided with a bore for receiving the locking shaft 105, which bore includes an enlarged diameter section 113 and reduced diameter section 114. The portion of the locking shaft 105 received in the bore section 113 is formed with an annular flange 115 which abuts the underside of the cover member 30 and an annular shoulder 116 which abuts the radial wall at the termination of the enlarged bore section 113 with the reduced diameter section 114. A torsion spring 118 is sleeved about the locking shaft 105 in the bore section 113 with one end anchored to the underside of the shaft flange 115 and its other end anchored to the radial bore wall. A reduced diameter section of the locking shaft 105 extends through the bore section 114 and the end thereof is interconnected with the clapper shaft 62 by the gear drive mechanism 106 whereby an axial rotation of the locking shaft 105 is adapted to impart pivotal movement to the clapper arm 70 and the clapper 60.

The gear drive mechanism 106, shown in detail in FIGS. 4-8, includes a drive gear 120 which is sleeved about the lower end of the locking shaft 105 and press fit thereon. A spline and groove connection 121 between the shaft 105 and drive gear 120 is provided to insure the drive gear 120 rotates in unison with the locking shaft. The drive gear 120 also connects with an idler gear 125 and a clutch gear 126, both of which are sleeved about the clapper shaft 62 and adapted to rotatably move thereon. The idler gear 125 abuts the yoke arm 73 and the clutch gear 126 abuts the yoke arm 74. The clutch gear 126 is also provided with a lug 128 which is adapted to engage a cooperable lug 129 on the yoke arm 74. The lugs 128 and 129 are normally disengaged from one another throughout a wide range of pivotal movement of the clapper 60 which allows the clapper 60 to free swing on the clapper shaft in a range of arcuate movement from the closed position in sealing engagement with the valve seat 77 to a position near the full open position. By an appropriate application of a torque force to the locking shaft 105 to cause its axial rotation, the gear drive 106 causes the clutch lug 128 to drivingly engage the clapper arm lug 129 and pivotally move the clapper arm and clapper 60 to the full open position. As the locking shaft 105 and drive gear 120 are rotated, the idler gear 125 rotates on the clapper shaft 62 and serves to maintain the various gears of the drive mechanism 106 in assembled condition and cooperative working engagement with one another. The torsion spring 118 operates to yieldingly oppose the axial rotation of the locking shaft 105 so that when the torque force applied by manual or hydraulically controlled actuation of the locking shaft 105 is removed, the spring returns the locking shaft to its original rotational position wherein the lugs 128,129 are disengaged and the clapper 60 allowed to free swing on the clapper shaft 62. A stop pin 131 mounted in the insert 50 extends into a radial slot 132 provided in the side of the locking shaft 105 and is adapted to engage the slot shoulder 133 to provide a shaft return stop.

It is preferred that actuation of the locking shaft 105 be accomplished from a remote location rather than require a manual actuation by a deep sea diver or the intercession of a remotely operated vehicle. Accordingly, an actuator assembly, which includes a hydraulic actuator 140 and an alternative manual actuator 141 is provided which can be mounted atop the cover member 30 and secured thereto by a readily separable fastener 142. The actuator assembly includes a circular support plate 144 to the underside of which, about its periphery, is bolted an excluder ring 146 by means of bolts 145. A circular opening 148 is provided at the center of the support plate 144 for accommodating a cover mandrel 149 affixed to the cover member 30. The cover mandrel 149, to be hereinafter further described, extends through the opening 148, and provides a means whereby a grappling tool, or the like, can seize hold of the mandrel 149 and lift the cover member from the valve body.

The hydraulic actuator 140 is secured to a tubular housing 151 which is affixed in sealing engagement with the underside of the support plate 144 about a second opening 154 in the support plate 144. The manual actuator 141 is secured to a tubular housing 152 which is affixed in sealing engagement with the top side of the support plate 144 with its tubular bore in coaxial alignment with the opening 154 and the lower tubular housing 151. The tubular housing 151 is adapted to sit on the cover member 30 and includes a tubular extension 151a of a size to be snugly received in the cover bore 108 which accommodates the upper end portion of the locking shaft 105. The housings are joined by bolts 153.

The tubular housings 151,152 enclose a pinion member 157 which is mounted for axial rotation within the tubular housings. The pinion member 157 is provided with an external annular flange 158 which provides a downward facing shoulder 159 for engaging an upward facing shoulder 161 formed in bore wall of the lower housing 151. The upper end of the pinion member 157 extends through a circular opening in the top of the upper tubular housing 152 but in sealing relationship therewith by means of an annular seal 162 affixed in a circumferential groove in the pinion member. A similar annular seal 163 seated in a circumferential groove adjacent its lower end establishes a fluid-tight seal with the bore of the lower tubular housing 151. The pinion member 157 is also provided with an axial bore 165 which extends completely through the member 157 and in its lower end portion is provided with a diameter which can closely accommodate the upper end portion of the locking shaft 105 when the actuator assembly is mounted as the cover member 30.

Within the pinion bore 165, a pair of diametrically opposed flat surfaces 166,167 are provided which extend in a convergently upward direction and are adapted to cooperatively engage a pair of similar conforming flat surfaces 171,172 provided on the upper end portion of the locking shaft 105. Accordingly, an axial rotation of the pinion member 157 effects an axial rotation of the locking shaft 105 by virtue of the driving engagement of the pinion flat surfaces 166,167 with the flat surfaces 171,172 of the locking shaft. The axial bore 165 through the pinion member 157 allows for the escape of sea water as the pinion member is installed over the locking shaft to thereby insure an operative engagement of the pinion member and the locking shaft.

Figure 10:
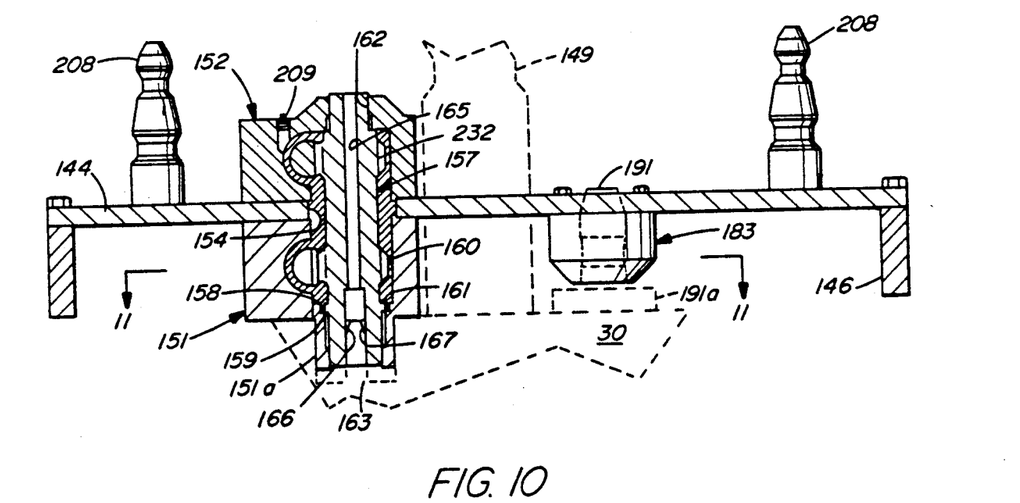
FIG. 10 is an enlarged vertical section of the valve actuator assembly as taken along the line 10—10 in FIG. 3.

As best seen in FIG. 10, the pinion member 157 is provided with a set of gear teeth which are formed circumferentially thereabout in the portion thereof which is enclosed by the lower tubular housing 151. The gear teeth accordingly provide a pinion gear 160 which is disposed in cooperative engagement with a rack gear formed by the provision of gear teeth along the length of a free floating movable piston 175 in a piston and cylinder assembly of the hydraulic actuator 140.

Figure 11:
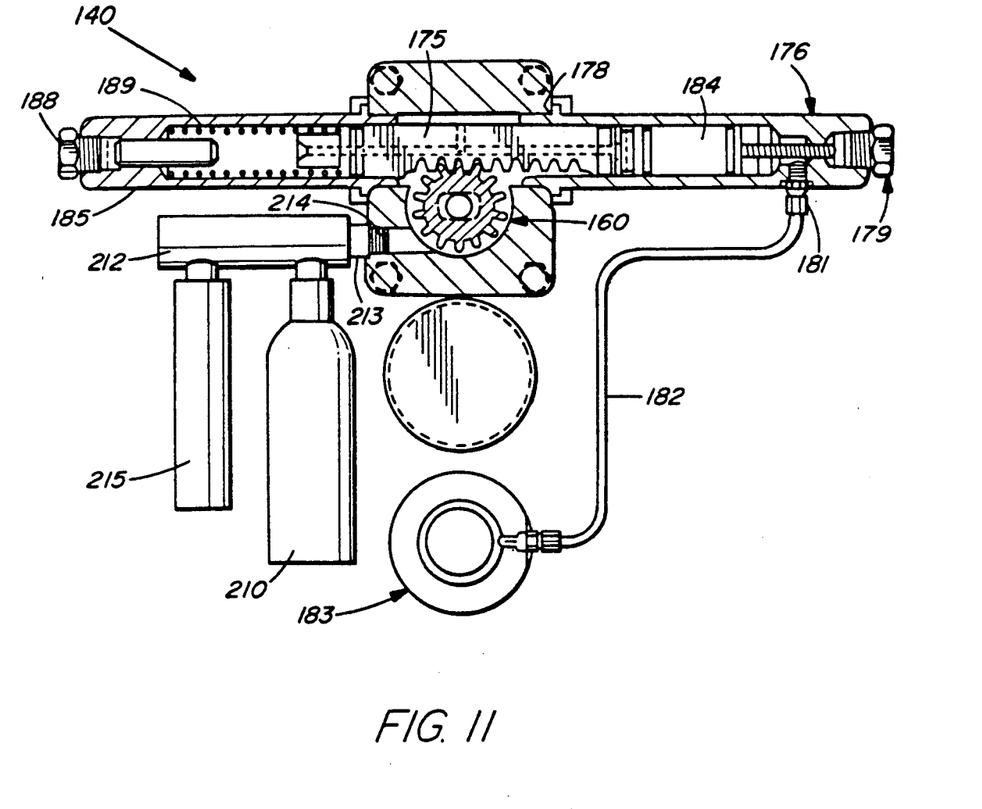
FIG. 11 is a plan view, partly in section, of the hydraulic actuator for the valve of FIG. 1, as taken along the line 11—11 FIG. 10.

Referring to FIG. 11, it is shown that the hydraulic actuator 140 comprises a cylinder 176 which is secured at its open end by a welded flange connection 178 with the housing 151 such that the interior of the cylinder 176 is in fluid communication with the interior of the housing 151. The other end of the cylinder 176 is closed by a threaded pipe plug 179 and adjacent its closed end is provided with a lateral opening which receives a fitting 181 on the end of a tubing 182 which couples with a hydraulic connector 183. The connector 183 also serves as a separable fastener for connecting the support plate 144 of the actuator assembly to the cover member 30, as will hereinafter be described.

The piston and cylinder assembly of the hydraulic actuator 140 includes a piston 184, one end of which abuts the free floating rack piston 175 and the other end of which is exposable to the application of pressurized hydraulic fluid which is deliverable thereto via the tubing 182. The assembly further includes a return spring housing 185 in the form of a cylinder connected at one end by a weld connection to the tubular housing 151 in coaxial alignment with the cylinder 176. At its other end, the cylinder 185 is closed by a threaded pipe plug 188. A coiled piston return spring 189 is positioned in the cylinder 185 to abut one end of the free floating rack piston 175 and exert an axially directed biasing force thereon. It will therefore be seen that application of hydraulic pressure to the cylinder 176 will drive the piston 184 and the free floating rack piston 175 against the return spring 189 to thereby turn the pinion gear 160 which rotates the locking shaft 105 and drives the clapper 60 to its fully open position.

The hydraulic connector 183 is comprised of a mandrel 191 with a rectangular base portion 191a secured by welding or otherwise to the top of the cover member 30. The base 191a is provided with a radial lateral bore 192 which communicates with an axial bore 193 in the mandrel 191. At its radial extermity, the bore 192 accommodates a fitting 194 on the end of a tubing 195, the other end of which is fitted to a crossover manifold 196. The manifold 196 is welded or otherwise secured to the top of the cover member 30 near the periphery thereof, and communicates with a passage 197 formed in the cover member 30 in a direction parallel to the central axis of the cover member. The passage 197 communicates with a similar passage 198 in the insert 50 by means of a sealed 37 stab-in" crossover connection 199. The passage 198 opens at the side of the insert 50, at which opening it is formed with internal threads for accommodating its connection to a hydraulic fluid supply line (not shown) which is coupled to a supply source of hydraulic pressure, which pressurized hydraulic fluid supply could be located on the sea floor, or at any convenient location.

The mandrel 191 is adapted for mating connection with a connecting ring 201 which is bolted to the underside of the cover member 30 and provided with an axial bore such that the ring 201 shaped to slip over the mandrel 191 so as to provide a frictionally secure connection therewith. The mandrel 191 is provided with a reduced diameter section which provides an annular chamber 203 about the mandrel. Annular seals 204,205 seated in accommodating grooves formed in the internal wall of the axial bore of the connecting ring 201 provides a fluid-tight seal for the chamber 203 which communicates with the central bore of the mandrel 191 by a radial bore 206 in the mandrel 191 and communicates with the tubing 182 by a fitting connection 207 threaded into a port in the side of the connecting ring 201.

It will therefore be seen that the hydraulic connection 183 which comprises the mandrel 191 and connecting ring 201 also serves as a separable fastener for securing the actuator assembly to the cover member. Since the fastener operates by the friction grip of the ring 201 on the mandrel 191, it can be readily separated by an upward lift on the support plate 144 to pull apart the ring 201 from the mandrel 191. To facilitate such separation, the support plate 144 is provided with a plurality of projecting actuator mandrels 208 on its topside and about its periphery such that these mandrels are readily accessible for seizure by a remotely controlled grappling tool, or the like, which can accomplish the separation of the actuator assembly from the valve 20 for such purposes as repair or replacement.

To provide a pressure balance for the hydraulic actuator 140, the tubular housings 151,152 which enclose the pinion member 157 are filled with a lubricating oil and a fill hole, normally closed by a threaded pipe plug 209, is provided in the top of the upper housing 152 for this purpose. For a subsea installation, the hydraulic actuator 140 is also provided with a bladder compensator 210 which connects with the interior of the housings 151,152 through a manifold 212 coupled to the lower housing 151 by a fitting 213 which is threaded into a port 214 provided in the wall of the housing 151. The bladder compensator 210, which is compressible in accordance with the ambient sea pressure, provides a means for utilizing the sea pressure to balance the fluid pressure in the actuator housings.

Should there occur a leak of hydraulic fluid into the lubricating oil in the housings 151,152, the resulting pressurization could lock the actuator. To prevent such a possibility, the manifold 212 is also provided with a pressure relief valve 215 which would alleviate the pressurization and allow the actuator to continue to operate.

Figure 12:
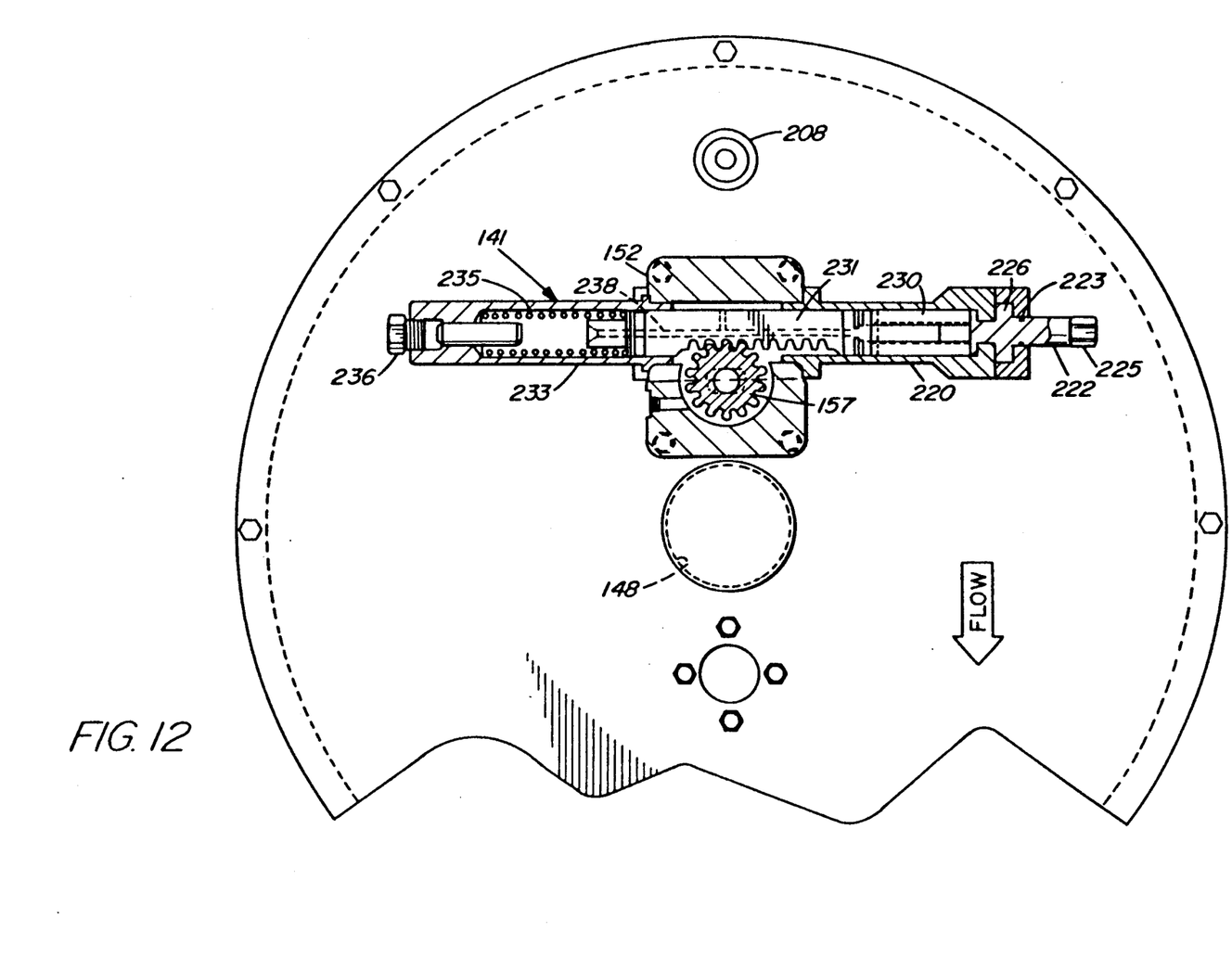
FIG. 12 is a top plan view, partly in horizontal section, of the manual actuator mounted atop the valve of FIG. 1.

While actuation of the locking shaft 105 to lock the clapper 60 in the full open condition will be preferably accomplished by use of the hydraulic actuator 140, it may on occasion be desirable to employ manual actuation as in the event of a hydraulic failure or during an inspection by a diver. The manual actuator 141, provided for this purpose, is a combination hydraulic/mechanical assembly which includes a cylinder 220 attached at its open end by a welded connection with the upper tubular housing 152 such that the bore of the cylinder 220 is in fluid communication with the interior of the tubular housings. The other end of the cylinder 220 is closed by a drive stem 222 which protrudes through an accommodating opening in the end of the cylinder but in sealing relation therewith by means of an annular seal 223 seated in a circumferential groove formed in the surface of the drive stem. At its end, external of the cylinder 220, the drive stem 22 is formed in octagonal cross section to provide a plurality of flat surfaces 225 for accommodating a tool for axial rotation of the drive stem. Intermediate its ends, the drive stem is provided with an annular flange 226 which provides a bearing surface for engaging an internal annular shoulder 228 formed within the cylinder 220. The remainder of the drive stem 220, intermediate the bearing flange 226 and its internal end, is externally threaded for the greater part, and is threadedly inserted within a traveling drive nut 230.

The manual actuator 141 also includes an elongate free floating rack member 231 and a return spring cylinder 233 which is attached, at its open end, by welded connection to the tubular housing 152 and in coaxial alignment with the cylinder 220. The rack member 231 is disposed with one end in sliding engagement with the internal wall of the cylinder 220 and its other end in sliding engagement with the internal wall of the spring cylinder 233. At each end, the rack member 231 is provided with wiper rings which sealingly and slidingly engage the cylinders 220,231. Intermediate its ends, the rack member 231 is provided with gear teeth which mesh with a second set of gear teeth provided about the upper end portion of the pinion member 157 to provide a pinion gear 232 for interaction with the rack 231.

The free floating rack member 231 is urged by a coiled return spring 235 in the cylinder 233 into abutting engagement with the drive nut 230. The cylinder 233 is filled with hydraulic fluid and accommodates at its distal end, a threaded pipe plug 236. The rack member 231 is formed with an axial bore 238 which extends therethrough and allows the displacement of hydraulic fluid from the cylinder 233 as the rack member is driven therein. It will therefore be seen, that by application of a suitable tool to the drive stem 222 so as to cause its axial rotation, the drive stem 222 will drive the traveling nut 230 in the direction of the tubular housing 152 and drive the rack member 231 against the return spring 235 thereby accomplishing a rotation of the pinion member 157. When the actuator assembly is installed in fastened engagement with the cover member 30, the axial rotation of the pinion member 157 by either the manual actuator 141 or the hydraulic actuator 140 will result in operation of the locking shaft 105 to drive the clapper 60 to its full open position. The clapper 60 is locked in the full open position by the drive stem 222 when using the manual actuator and by the maintenance of hydraulic pressure to the hydraulic piston 184 when using the hydraulic actuator.

Figure 13:
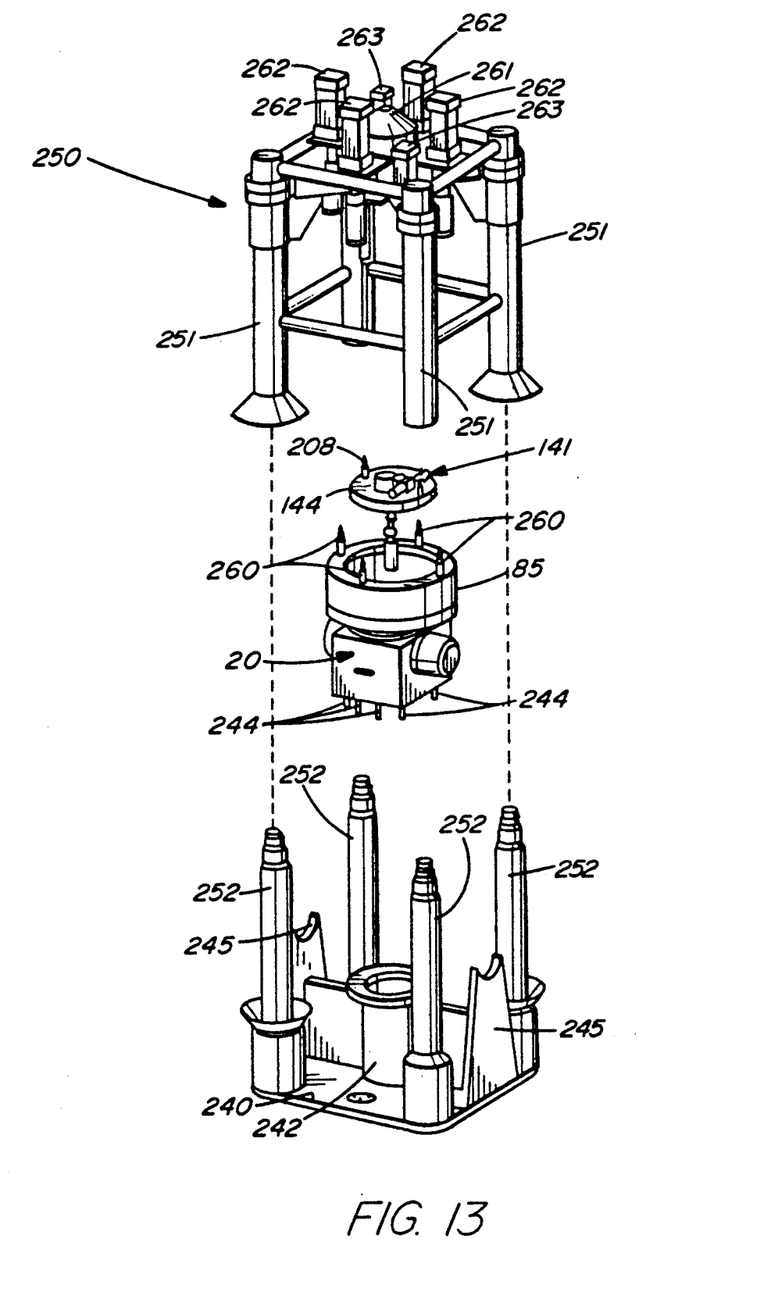
FIG. 13 is an exploded view showing the orientation of a valve intervention tool or grappling tool for interacting with the subsea valve.

When the subsea barrier valve 20 is installed in a subsea pipeline, it is preferably supported on a base assembly which includes a baseplate, such as the baseplate 240 shown in FIG. 13, which is an exploded view of a representative subsea installation of the valve 20. The baseplate 240 is provided with a central pedestal 242 which is adapted to directly support the valve 20. The pedestal 242 may be provided with a circular flange 243 having a plurality of circumferentially spaced holes for receiving an equal number of mounting studs 244 affixed to the underside of the valve body 21. On either side of the pedestal 242, the baseplate may also be provided with upright supports 245 which are adapted to support the pipeline thereon.

The valve 20 with its cover member 30 clamped in place by the releasable clamp means 35 may be readily carried by an appropriate grappling tool such as the valve intervention tool 250 shown in FIG. 30 which is adapted to seize the cover mandrel 149 for orienting the valve and lowering it onto the baseplate 240. For orientation purposes, the tool 250 is provided with four tubular legs 251 which are adapted to sleeve over four posts 252 fixed upright on the baseplate 240. The valve intervention tool 250 is also provided with a plurality of hydraulically actuated latching mechanisms, such as the latching mechanism 255 shown in FIG. 14, for interacting with and seizing the various mandrels provided on the valve 20.

As previously stated, the cover member 30 is provided with a cover mandrel 149 and actuator mandrels 208 are supplied for the actuator support plate 144. For operation of the releasable cover clamp means 35, a plurality of circumferentially spaced clamp mandrels 260 are provided for the clamp ring 85. The clamp mandrels 260 are adapted to be seized by a suitable grappling tool, such as the tool 250, and the clamp ring 85 sleeved about the adapter ring 86 to effect the clamping of the cover member 30 to the valve body 21. The tool 250 by gripping the clamp mandrels 260 can also be used to release the clamp means 35 by a pull on the clamp mandrels which will extract the clamp ring from its sleeved clamping engagement with the collet members 87.

The valve intervention tool 250 is provided with a plurality of latching mechanisms 255, equal in number to the total number of mandrels on the valve 20 with which the latches are adapted to interact. Accordingly, the tool 250 is provided with a centrally located latching mechanism 261 for interacting with the cover mandrel 149, four latching mechanisms 262 for interacting with the clamp mandrels 260, and a pair of latching mechanisms 263 for interacting with the actuator mandrels 208.

Figure 14:
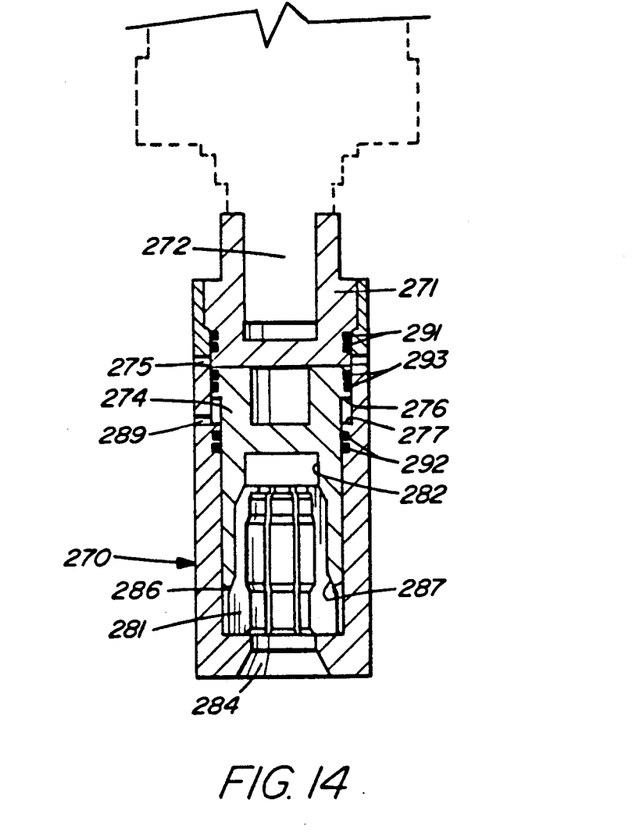
FIG. 14 is a schematic illustration of a hydraulically actuated grappling tool which may be used with the valve of the invention.

A representative latching mechanism which might be employed in the tool 250 is illustrated in FIG. 14. The latch mechanism comprises a tubular housing 270 which at one end is threaded about an adapter cap 271, which is itself threaded on to the end of the piston rod 272 of a piston and cylinder assembly of a commercially available type. The piston and cylinder assembly, a portion of which is shown in dashed lines in FIG. 14, is provided with a hydraulic system (not shown) which allows driving the piston rod 272 in both axial directions. The latching mechanism also includes a latching sleeve 274 in the form of a piston slidably mounted in the housing 270. By means of a port 275 provided through the wall of the housing 270 near its point of attachment to the adapter cap 271, a hydraulic line may be connected thereto and pressure applied from a suitable source to drive the latching sleeve 274 downwardly in the housing 270 for effecting a latch with a mandrel, such as the cover mandrel 149.

Downward movement of the latching sleeve is limited by cooperating shoulders 276,277 provided on the latching sleeve 274 and housing 270 respectively. Actual latching to the mandrel is effected by a plurality of collet members 281 disposed in a ring about the axis of the latching sleeve 274 within an axially extending blind bore 282 formed in the end of the latching sleeve 274 in coaxial relation with the axial opening 284 in the end of the tubular housing 270 remote from its connection with the adapter cap 271. The several collet members 281, which are supported and retained in the bore 282 by an upward facing internal shoulder 286 formed near the open end of the housing 270, are adapted to first yield in an outwardly radial direction by engagement with the end of the mandrel which is received through the housing opening 284 when the piston 272 drives the latching mechanism over the mandrel. The collet members 281 are then urged radially inward by the engagement of a tapered shoulder 286 of each collet member with the annular wall 287 provided by the latching sleeve bore 282 which is of smaller diameter than the diameter provided by the ring of the collet tapered shoulders 286. The collet members 281 thereby effect a clamping engagement with the mandrel which is releasable by the selective application of hydraulic pressure to the latching sleeve shoulder 276 through a second port 289 as hydraulic pressure through the port 275 is withdrawn. To insure fluid-tight integrity, annular seals 291 are provided on the exterior of adapter cap 271 and annular seals 292 provided on the interior wall of the tubular housing 270. The latching sleeve 274 is provided with piston ring seals 293.

It is to be appreciated therefore that a new and improved subsea barrier valve of the check valve type is disclosed herein. The unique mounting of the valve clapper shaft on a valve insert avoids the conventional provision of holes in the valve body through which the clapper shaft is installed or withdrawn from the valve body. Such holes in the valve body not only reduce the integrity of the valve and reliability of valve operation, but require a complex, time consuming and dangerous procedure to be employed when it is desired to remove or replace the valve internals.

The inclusion in the invention of means for driving and locking the clapper in the full open position by a locking shaft arranged to extend through the valve cover in a right angle drive relationship with the clapper shaft provides unique advantages in procedures for the maintenance and repair of a subsea barrier valve. These procedures can be performed by remote operation of a valve intervention tool supplied with conventional commercially available latching mechanisms. The unique mounting of the clapper allows the clapper to free swing to open the valve on the introduction of pressurized gas to the inlet of the valve and also in the event of an upstream pipeline rupture to close in a failsafe maneuver so as to prevent the reverse flow of gas through the valve.

It is also to be understood that the foregoing description of a preferred embodiment of the invention has been presented for purposes of illustration and explanation and is not intended to limit the invention to the precise form disclosed. For example, the number of mandrels provided for interaction with the valve intervention tool 250 may be other than disclosed herein and modifications may be made in the shape of the mandrels for accommodating their interaction with different types of latching mechanisms. It is to be appreciated therefore, that various material and structural changes may be made by those skilled in the art without departing from the spirit of the invention.

I claim:

1. A subsea barrier valve comprising a valve body having a valve chamber therein and inlet and outlet ports communicating with said chamber to define a flow passage through said valve, said valve body having an access opening communicating with said valve chamber;

a cover member for said access opening;

a valve insert member mounted to said cover member and suspended thereon within said valve chamber;

a valve clapper element in said chamber;

a valve clapper shaft mounted on said valve insert body in said valve body for limited axial rotation;

means connecting said valve clapper to said clapper shaft whereby said valve clapper is pivotally movable in said valve chamber between a first closed position wherein said valve clapper closes said flow passage and a second full open position wherein said valve clapper is an unobstructing valve open position with respect to said flow passage with said flow passage being partially open when said valve clapper is in a pivoted position intermediate said first and second positions;

clamp means for releasably clamping said cover member to said valve body in a position which covers and seals said access opening, said cover member having a bore opening extending therethrough;

latch means selectively operable for latching said valve clapper in the valve open position, said latch means comprising a locking shaft mounted to extend through said valve cover bore opening with an internal end portion of said locking shaft extending into said valve chamber and an external end portion being engageable outside said cover member to impart axial rotation to said locking shaft;

seal means mounted in said cover bore opening for establishing a fluid-tight seal between said locking shaft and said cover member; and a drive gear mechanism operatively connected to said internal end portion of the lock shaft responsive to axial rotation of said locking shaft to pivotally move said valve clapper between the valve closed and valve open positions and to lock said valve clapper in the valve open position, said drive mechanism including a clutch gear means for allowing free pivotal movement of said clapper element from the valve closed position to a position proximate said full open position.

2. A subsea barrier valve as set forth in claim 1 wherein said locking shaft extends in substantially perpendicular relationship to the valve clapper shaft.

3. A subsea barrier valve as set forth in claim 2 further including actuator means mounted on said cover member externally of said valve body for selectively engaging the external end portion of said locking shaft to impart axial rotation thereto and thereby pivotally move the valve clapper.

4. A subsea barrier valve as set forth in claim 3 wherein said actuator means comprises a hydraulic actuator including a hydraulic piston and cylinder assembly and a pinion member including a first pinion drive gear responsive to movement of said piston on the selective application of hydraulic pressure to said piston and cylinder assembly to axially rotate said locking shaft and thereby move the valve clapper to the full open position.

5. A subsea barrier valve as set forth in claim 4 wherein said actuator means further includes a manual actuator comprising a rack and pinion assembly, a second pinion drive gear on said pinion member and a mechanical drive means for manually moving said rack whereby said pinion member is movable by said rack to axially rotate said locking shaft and thereby move the clapper member to the full open position.

6. A subsea barrier valve as set forth in claim 5 wherein said hydraulic actuator and manual actuator are alternative means for actuating said valve clapper.

7. A subsea barrier valve as set forth in claim 1 wherein said clamp means comprises a plurality of clamp members disposed in engagement with said cover member and said valve body and a clamping ring positionable in sleeved wedging relation to said clamp members for wedging said clamp members against said cover member and valve body to thereby clamp the cover member to the valve body, said clamping ring having a plurality of clamping ring mandrels projecting outwardly from one side of the clamping ring whereby said mandrels are adapted to be seized by a grappling tool and said clamping ring may be either extracted from sleeved wedging relation with said clamp members to release said cover member or placed in sleeved wedging relation therewith.

8. A subsea barrier valve as set forth in claim 3 wherein said cover member is provided with a cover mandrel projecting outwardly therefrom whereby said cover mandrel is adapted to be seized by a grappling tool for lifting the valve from a subsea installation or whereby said locking shaft, clapper shaft and valve clapper attached to said cover member may be lifted out of said valve body or lowered into said valve body when the cover member is released by said clamp means.

9. A subsea barrier valve as set forth in claim 3 wherein said actuator means are fixedly mounted on a support plate provided with a separable fastener for fastening said actuator support plate on said cover member and a plurality of actuator mandrels projecting outwardly from one side of said support plate whereby said actuator mandrels are adapted to be seized by a grappling tool to lift said support plate from said cover member and release said fastener for retrieval of the actuator means or to replace said actuator means by placing said support plate on said cover member in fastened connection therewith.

10. A subsea barrier valve comprising a valve body having a valve chamber therein and inlet and outlet ports communicating with said chamber to define a flow passage through said valve, a valve clapper element in said chamber;

a valve clapper shaft mounted in said valve body for limited axial rotation;

means connecting said valve clapper to said clapper shaft whereby said valve clapper is pivotally movable in said valve chamber between a first closed position wherein said valve clapper closes said flow passage and a second full open position wherein said valve clapper is an unobstructing valve open position with respect to said flow passage with said flow passage being partially open when said valve clapper is in a pivoted position intermediate said first and second positions, said valve body having an access opening communicating with said valve chamber;

a cover member for said access opening, said cover member having a bore opening extending therethrough;

clamp means for releasably clamping said cover member to said valve body in a position which covers and seals said access opening;

latch means selectively operable for latching said valve clapper in the valve open position, said latch means comprising a locking shaft mounted to extend through said valve cover bore opening with an internal end portion of said locking shaft extending into said valve chamber and an external end portion being engageable outside said cover member to impart axial rotation to said locking shaft;

seal means mounted in said cover bore opening for establishing a fluid-tight seal between said locking shaft and said cover member; and a drive gear mechanism operatively connected to said internal end portion of the lock shaft responsive to axial rotation of said locking shaft to pivotally move said valve clapper between the valve closed and valve open positions and to lock said valve clapper in a valve open position, said drive mechanism including a clutch gear means for allowing free pivotal movement of said clapper element from the valve closed position to a position proximate said full open position.

11. A subsea barrier valve comprising a valve body having a valve chamber therein and inlet and outlet ports communicating with said chamber to define a flow passage through said valve, said valve body having an access opening communicating with said valve chamber;

a cover member for said access opening;

a valve insert member mounted to said cover member and suspended thereon within said valve chamber;

a valve clapper element in said chamber;

a valve clapper shaft mounted on said valve insert body in said valve body for limited axial rotation;

connection means for connecting said valve clapper to said clapper shaft whereby said valve clapper is pivotally movable in said valve chamber between a first closed position wherein said valve clapper closes said flow passage and a second full open position wherein said valve clapper is an unobstructing valve open position with respect to said flow passage with said flow passage being partially open when said valve clapper is in a pivoted position intermediate said first and second positions, said cover member having a bore opening extending therethrough;

latch means selectively operable for latching said valve clapper in a valve open position, said latch means comprising a locking shaft mounted to extend through said valve cover bore opening with an internal end portion of said locking shaft extending into said valve chamber in connecting relation with said clapper shaft and an external end portion of said locking shaft being engageable outside said cover member to impart axial rotation to said locking shaft, said conntection means being responsive to a selected direction of axial rotation of said locking shaft to effect axial rotation of the valve clapper shaft and pivotal movement of said valve clapper element from said closed to said open positions for latching of the valve clapper element in the valve open position; and seal means mounted in said cover bore opening for establishing a fluid-tight seal between said locking shaft and said cover member.

12. A subsea barrier valve comprising a valve body having a valve chamber therein and inlet and outlet ports communicating with said chamber to define a flow passage through said valve, said valve body having an access opeing communicating with said valve chamber;

a cover member for said access opening;

a valve insert member mounted to said cover member and suspended thereon within said valve chamber;

a valve clapper element in said chamber, said valve insert member having an opening extending through the valve insert member in registry when said valve flow passage and of a size sufficient to accommodate the valve clapper element therein, said valve insert member having a pair of opposed journal bearings formed in the walls defining said opening in said valve insert member;

a valve clapper shaft having end trunnions journalled on said bearing surfaces and mounted on and supported solely by said valve insert for limited axial rotation;

means connecting for valve clapper to said clapper shaft whereby said valve clapper is pivotally movable in said valve chamber between a first closed position wherein said valve clapper closes said flow passage and a second full open position wherein said valve claper is an unobstructing valve open position with respect to said flow passage with said flow passage being partially open when said valve clapper is in a pivoted position intermediate said first and second positions; and clamp means for releasably clamping said cover member to said valve body in a position which covers and seals said access opening.

* * * * *